(12) United States Patent
Mont et al.

(10) Patent No.: US 8,397,302 B2
(45) Date of Patent: Mar. 12, 2013

(54) SYSTEM AND METHOD FOR ANALYZING A PROCESS

(75) Inventors: Marco Casassa Mont, Bristol (GB); Yolanta Beresnevichiene, Bristol (GB); Simon Kai-Ying Shiu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 12/916,265

(22) Filed: Oct. 29, 2010

(65) Prior Publication Data

US 2012/0110670 A1 May 3, 2012

(51) Int. Cl.
*G06F 12/16* (2006.01)
(52) U.S. Cl. .................... 726/25; 726/1; 726/2
(58) Field of Classification Search ............ 726/25
See application file for complete search history.

(56) References Cited

U.S. PATENT DOCUMENTS

| | | | | |
|---|---|---|---|---|
| 2005/0038993 | A1* | 2/2005 | Zivic et al. | 713/164 |
| 2005/0066195 | A1 | 3/2005 | Jones | |
| 2007/0061125 | A1* | 3/2007 | Bhatt et al. | 703/20 |
| 2008/0005555 | A1 | 1/2008 | Lotem et al. | |
| 2011/0173693 | A1* | 7/2011 | Wysopal et al. | 726/19 |

OTHER PUBLICATIONS

Schell, Frank, Jochen Dinger, and Hannes Hartenstein, "Performance Evaluation of Identity and Access Management Systems in Federated Environments", <http://springerlink.com/content/q5644583m4706qr3/>.

Schell, Frank, Andreas Schaf, Jochen Dinger, and Hannes Hartenstein, "Assessing Identity and Access Management Systems Based on Domain-specific Performance Evaluation", < http://portal.acm.org/citation.cfm?id=1712648&dl=GUIDE&coll=GUIDE&CFID=103517836&CFTOKEN=32614122 > Jan. 28-30, 2010, pp. 253-254.

Mont, Marco Casassa, Adrian Baldwin, Jonathan Griffin, Simon Shiu, and Yolanta Beres, "Identity Analytics: Using Modeling and Simulation to Improve Data Security Decision Making", < http://www.hpl.hp.com/techreports/2008/HPL-2008-188.pdf >.

* cited by examiner

*Primary Examiner* — Matthew Smithers
(74) *Attorney, Agent, or Firm* — Kevin Mudge

(57) ABSTRACT

A system for analyzing a process, comprising a model engine to generate a model of the environment using multiple components defining adjustable elements of the model and including components representing a process for provisioning and de-provisioning of access credentials for an individual in the environment and a risk analyzer to calculate multiple randomized instances of an outcome for the environment using multiple values for parameters of the elements of the model selected from within respective predefined ranges for the parameters, and to use a results plan to provide data for identifying the security risk using the multiple instances.

19 Claims, 9 Drawing Sheets

SYSTEM AND METHOD FOR ANALYZING A PROCESS

BACKGROUND

In complex and generally large scale systems and organizations such as corporate Information Technology (IT) infrastructures for example, there exist potential impacts to the security of the system. Such security vulnerabilities, even if they can be discovered and defined in a meaningful way, are typically difficult and costly to assess. This can be because of the number and nature of the vulnerabilities for example, as well as the number of assets present in such large systems, all of which can have an impact on potential solutions which vary greatly.

For example, as people join and leave an organization or change their roles, their access rights should reflect these changes. The processes involved can be complex and difficult to manage, especially when an employee turnover is high, parts of the IT organization is outsourced, and management behavior interferes with good security practices for example. Equally these latter activities are expensive and quite often detect violations and issues a long time after they have happened. Typically, one of the main threats which exposes an organization to risk is related to the abuse and misuse of access rights. This can be carried out by personnel (and ex-employees) for a variety of reasons, including curiosity, revenge or economic matters for example.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

As people (such as those in a workforce of an organization for example) join and leave an organization or change their roles within the organization, their access rights are typically adjusted to reflect these changes. In the case of privileged accounts for example, which can include security or access credentials for a user which permit access (such as read and/or write access) to systems or records of the organization which are restricted to certain levels within a hierarchy of the organization, i.e. such that a proportion of a workforce has such access for example, access rights should be monitored and adjusted as needed. In general however, a process for the control of identity and access management (IAM) for any level of access in an organization should be defined and managed.

According to an example, there is provided a system and method to enable decision makers in an organization to describe their IAM (security) issues of interest in the context of their organizational context such as processes, people, threats, and so on. For example this might include the need to better understand the organizational risk exposure to existing provisioning and de-provisioning processes involving the management of user accounts and related access rights. Further, there is provided a system and method to enable decision makers to review (by means of explicit representations within models for example) the IAM processes that are currently in place within their organizations, assess their failure points and the impact on metrics of interest. For example, this could include the IAM processes to provision and de-provision access rights to employees. Failure points could include the provision of hanging accounts for example. Related metrics can provide a quantification of these aspects. A system and method according to an example can enable decision makers to assess the impact of decision options for IAM in an organization, for example by exploring the consequences of investing more in IAM automation or by changing a behavior of people involved.

According to an example, effectiveness of organization's IAM provisioning and de-provisioning processes can be determined using a system to explore a space of output configurations for an original access management process and a new process in the case that some IAM automation is introduced. An impact on risk exposure as well as future enhancements can be calculated and explored to determine dependencies among different aspects affecting these access management processes and the impact of changing them by introducing different degrees of automation. Accordingly, common decision makers' issues in the IAM space can be addressed, such as understanding a risk exposure due to the current provisioning and de-provisioning processes, and exploring the impact of potential alternative decisions and investment options.

Figure 1:
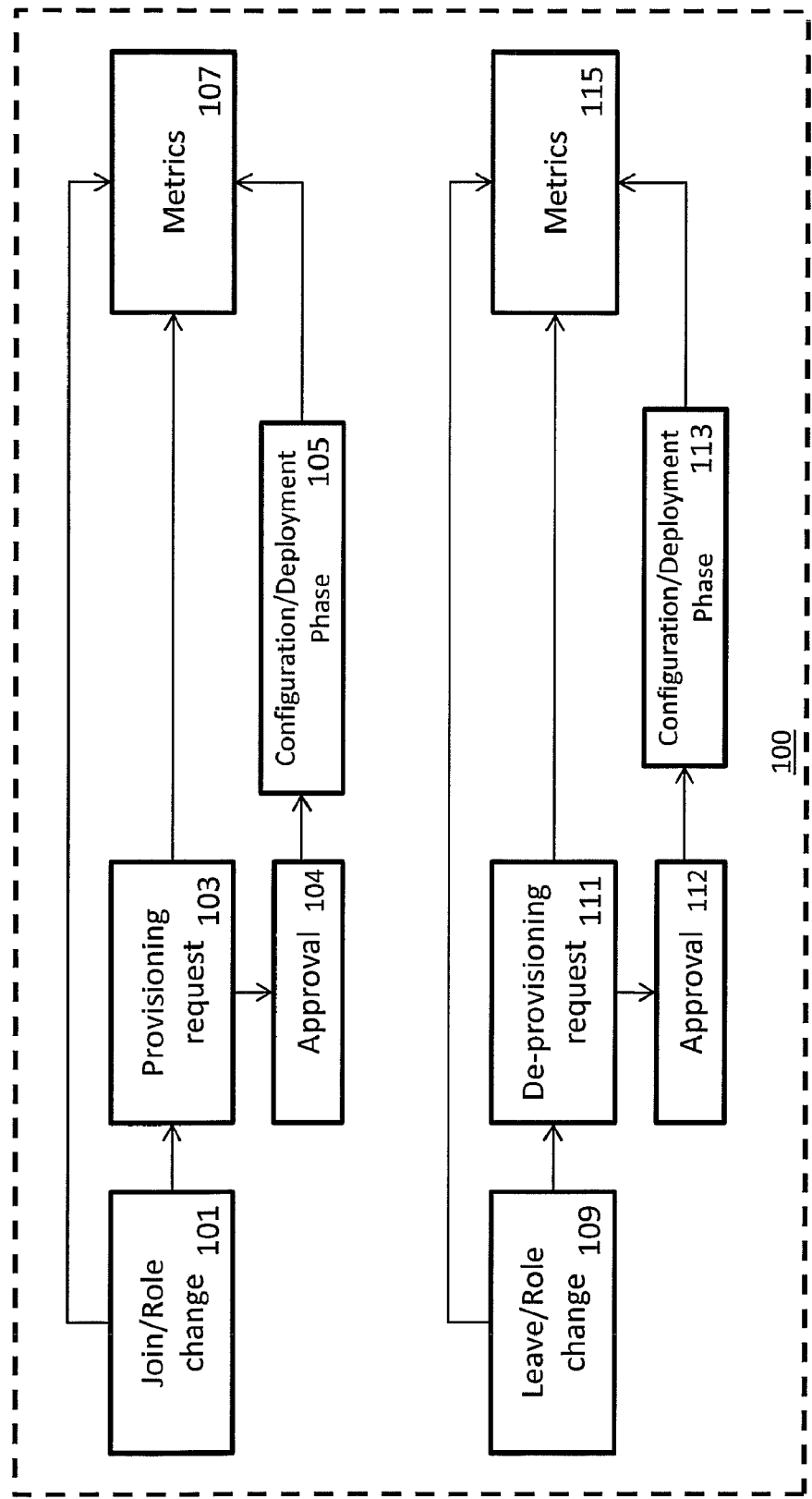
FIG. 1 is a schematic block diagram of typical organizational identity and access management provisioning and de-provisioning processes according to an example.

FIG. 1 is a schematic block diagram of typical organizational identity and access management provisioning and de-provisioning processes. In an environment 100, such as a corporate environment for example, a person can join the environment or change roles therein—the role change can mean that access privileges for that person in the environment 100 should be upgraded, downgraded or created. Accordingly, each change can cause a request 103 for the provision of access to a system of the environment 100. Following approval 104 of the request, there is a configuration/deployment phase 105 in which the access rights are determined, verified and deployed for the user. For example, an IT department within the organization of environment 100 can generate the desired security or access credentials for the user in response to the request 103, and communicate those credentials to the user, or someone else in the user's hierarchy (such as a manager for example). A set of metrics 107 can be used to monitor various parameters associated with all parts of the provisioning process. For example, the time taken to process the request can be monitored, as well as whether or not the configuration and/or deployment phase 105 was successful. The metrics can affect the overall process. For example, if a metric associated with the provisioning request 103 falls below a threshold, the request can be denied. For example, if the request is determined to come from an individual not permitted to make the request, it can fail.

Similarly, if a person leaves a role or the role changes to the extent that access privileges should be downgraded or revoked (109), a de-provisioning request 111 can be used to fulfill the changes. For example, a user may leave an organization or move roles within the organization, and as a result may no longer have cause for previously used access privileges. Accordingly, following an approval 112, a configuration/deployment phase 113 determines the access rights which should be changed as a result of the request 111, and executes the changes by, for example, revoking a security credential for the user or downgrading/changing a security credential so that access privileges for the user are less privileged than they were, or permit access to limited or different systems than before the change was deployed. A set of metrics 115 can be used to monitor various parameters associated with the request 111. For example, the time taken to process the request can be monitored, as well as whether or not the configuration and/or deployment phase 113 was successful. A set of metrics 107 can be used to monitor various parameters associated with all parts of the provisioning process. For example, the time taken to process the request can be monitored, as well as whether or not the configuration and/or deployment phase 105 was successful. The metrics can affect the overall process. For example, if a metric associated with the de-provisioning request 111 falls below a threshold, the request can be denied. For example, if the request is determined to come from an individual not permitted to make the request, it can fail.

Accordingly, a security risk in an environment can be related to a lack of identity and access management. For example, the provisioning an de-provisioning processes related to access controls can give rise to a security risk by provisioning the wrong access rights to certain individuals, causing delays in provisioning and de-provisioning thereby causing access rights to be incorrect for a period of time in which they could be used for purposes which could give rise to a security risk (such as by a user accessing a system they are not permitted to access, or a user not being able to access a system that they are permitted to access for example).

According to an example, a system and method as described herein can be used in other identity and access management situations and for other identity and access management processes. For example, in job design, which is about identifying (and designing) suitable roles for the workforce in an organization (usually in specific areas, such as IT)—along with the set of tasks allocated to each role. For example a role might be "Data Base (DM) Administrator". The role could be associated to tasks such as DB maintenance, DM back-up, management of DB schemas, its content and DB users, etc. Privileged access rights might need to be provided to employees fulfilling these roles in order to enable them to carry out associated tasks.

This is a strategic activity as the wrong allocation of activities/tasks to roles can have a negative impact on security (e.g. enabling toxic combinations of tasks that can be leveraged to carry out criminal activities), productivity and costs. Sometimes compromises/trade-offs might be desired, given the available workforce, their skills and business needs. Accordingly, a security or method according to an example can help to model the processes involved and analyze the risks in a specific job design (i.e. instance of roles and tasks), explore trade-offs and the impact on other aspects of relevance such as costs, productivity, etc.

A further example is in the separation of duties (SoD). This is partially related to the job design area but it is often referred to as an aspect on its own. Separation of Duties is concerned with ensuring that privileges and access rights are provided to people (and/or roles) in a way to minimise conflicts that could degenerate into misuses and exploitations. For example, in a banking environment, there is a clear separation between the role/access rights that enable a clerk to create customer bank accounts and the access rights/role to enable transfer money between accounts. This to avoid, for example, the situation in which a clerk could illegally transfer money from a customer to a fictious account he might own. In this case, a system or method according to an example can help to model processes and analyze risks, explore trade-offs, and the implications of various SoD choices for a given environment.

A further example is in the area of personnel vetting, which is the process that companies carry out to clear personnel, e.g. to give them Security Clearance (SC) or Developed Vetting (DV) clearances. This applies to personnel that need to work in certain environments (e.g. secret government projects, need to access confidential information, etc.). It usually involves dealing with a set of checks, including background checks, Criminal Record Bureau investigations, Financial assessments, checking of references, etc. A system or model according to an example can help to model these processes and risks and explore trade-offs, for example between security and productivity.

A further example is in the field of compliance checking, auditing and remediation, which are the processes that organizations put in place to check for violation and failures and remediate them. The main driver is compliance against policies/legislation and the need to pass related audits. The area is quite broad: IAM is just one of the verticals of relevance. In the IAM space, the compliance checking processes are complementary to the provisioning/deprovisioning ones. For example, they aim to identify user accounts and related access rights that have wrongly been provisioned/de-provisioned and that violate policies (e.g. over provisioned accounts, hanging accounts, etc.). Processes can be put in place to remediate/fix these situations (e.g. by removing unneeded access rights and accounts). Systems or methods according to an example can help to explicitly model these processes and compare and contrast their impact against auditing processes. It enables "what-if" analysis i.e. exploring the impact of different types of investments (e.g. adding more personnel, more automation, etc.) on aspects of relevance, such as audit failures, security risks, productivity, etc.

Figure 2:
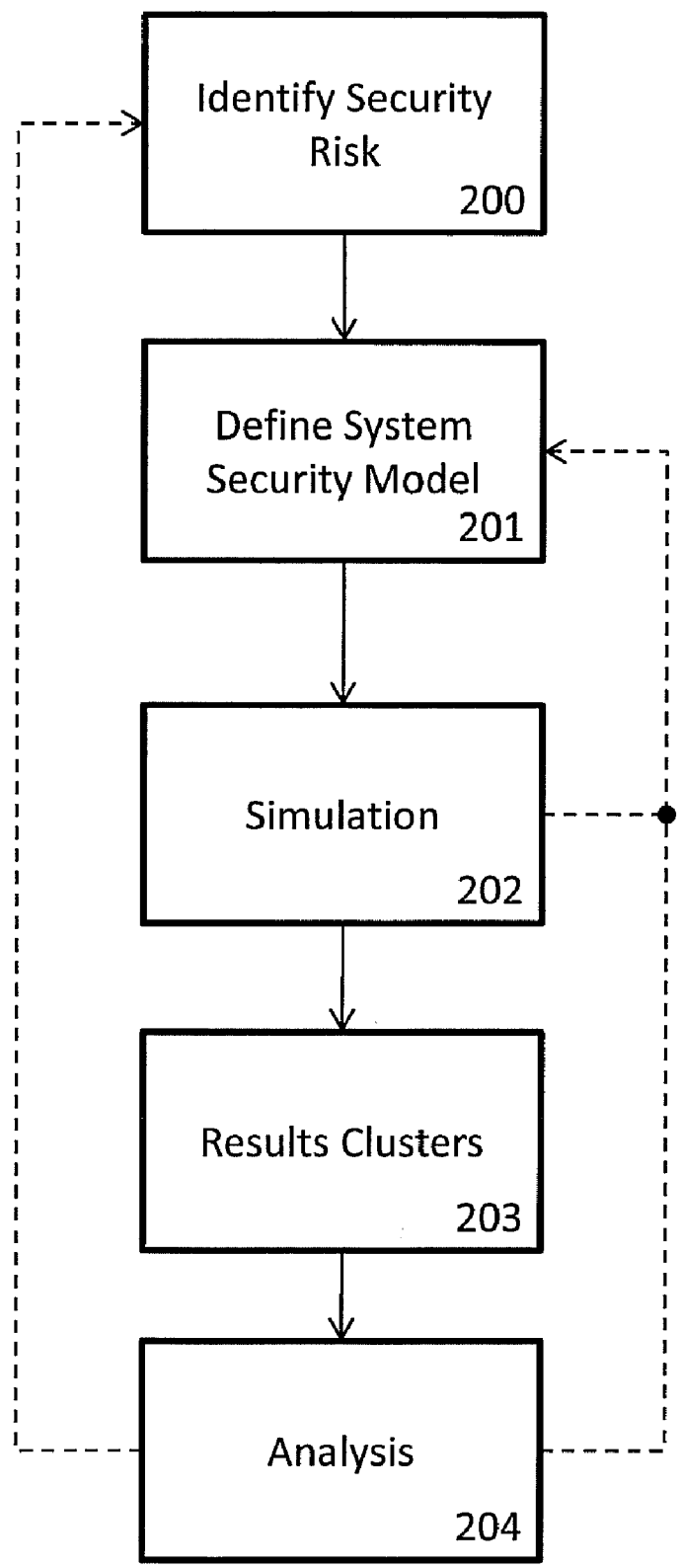
FIG. 2 is a schematic block diagram of a method for analyzing an environment according to an example.

FIG. 2 is a schematic block diagram of a method for analyzing a system according to an example. In block 200 a potential security risk for the system is identified. This can include a characterization of an issue, such as a characterization provided by a decision-maker in an organization for example (e.g., a client organization's Chief Information Security Officer—CISO). For example, the organization may consider investing in specific solutions to better manage access privileges of its users. Associated with this investment, the CISO has a range of choices for the nature of the resulting system configuration, including security controls and specific solutions, and a range of preferences among the security outcomes. The identified security risk could therefore be a risk associated with a lack of implementation of identity and access controls for example. According to an example, this is a discovery or identification phase.

In block 201, the dynamics of the outcomes determined in the identification phase are explored by constructing an executable system security model of the system in the context of its dynamic threat and economic environments. Accordingly, in this modeling stage the architectural, policy, business process, and behavioral constraints which are inherent in the security risk are captured and formalized. According to an example, threat environment characteristics such as potential attacker behavior, threat vectors and probabilities and other externalities that may influence an internal business process or human behavior in the organization are identified and captured in the model as events. The modeling stage includes observations of stages and decision points of the system involved. According to an example, the modeling cycle can be repeated until a model is determined to sufficiently capture the decision making situation. For identity and access control, a model can define the way in which the organization in question will be affected if (and how) certain access control systems are implemented. Accordingly, the model can be used to demonstrate the security risk in an environment as a result of a lack of implementation, or an implementation not aligned with operational characteristics of the organization or not appropriately addressing the risk.

According to an example, defining a model 201 or representation includes using a set of internal and external components to represent aspects of the security risk under consideration, which aspects may influence the security risk, and influence the way in which the risk affects an organization. External components may correspond to a threat environment and can include the rate of discovery of vulnerabilities, a speed to develop exploits, a speed to develop patches and signatures, attacker behavior etc. Internal components can include specific tasks undertaken in security operations, a speed with which these tasks are undertaken and specific security solutions and mechanisms and their properties. This might also include behavioral aspects that affect security, such as personnel movements and habits (such as writing a password down for example). Components can be static or dynamic—that is to say, a component can have a behavior in a model which is dependent on previous decision points, or can be a component which generates a value from an associated probability distribution such that the value can change dynamically in response to repeated runs of a model and in response to an input value received by the component (which affects the output).

In deriving a model, considerations which include the investment choices which can be made, and a set of measures representing a search domain for choices can be taken into account. For example, a particular investment choice could include the provision of installing biometric sensors at various locations and with varying complexity at certain positions within an organization. Accordingly, a search domain for the choices can include ranges associated with a number, location and complexity of sensors. Variation of these parameters within the defined ranges will typically result in multiple outcomes which affect the way in which an associated security risk may (or may not) be mitigated—in this context a risk may include denying access to authorized personnel, or a failure to install a sensor in a location thereby allowing access where it should actually be more strictly controlled. According to an example, a search domain or range for a parameter can be derived in an identification phase and based on characteristics of the environment to be modeled and based on how the risk is managed in an organization embodied by the representation of the environment. It can be modified in response to an indication that the range is not suitable. For example, for a given search range, a set of outcomes can lead to a conclusion that the range needs to be altered in order to encompass a different space of results which may be more suitable for determining how to mitigate a certain risk. According to an example, a model or representation can be a graphical model or representation, or a representation provided in another form, such as a textual representation for example, in which aspects of a model are represented by respective portions of marked up text for example.

In block 202, the model of block 201 is used in order to generate data in the form of results clusters 203 which can be used for analyzing (block 204) the system in view of the risk or solution. That is to say, using the model, behavior is simulated using the representation of a dynamic threat and economic environment by exploring the search domains in order to provide results clusters 203 which can be in the form of multiple output configurations for the situation or risk. The output configurations represent outcomes associated with choices which can be made to mitigate the effects of the identified security risk in the system. Results and conclusions can be validated against the preferences of the decision-maker, such as the CISO for example. In case they do not match the preferences, further refinement of the components can take place. Alternatively, if a search domain is determined to be unsuitable it can be widened or narrowed in scope.

Accordingly, a system according to an example uses a model corresponding to a characterization of a risk in a dynamic threat environment determined in an identification phase to provide a set of output calculations which are used to determine a solution, perhaps including refinement using the initial identification and/or model. As indicated by dotted lines in FIG. 2, an identified risk and/or a model can be refined or altered in response to findings from a simulation or analysis phase.

Figure 3:
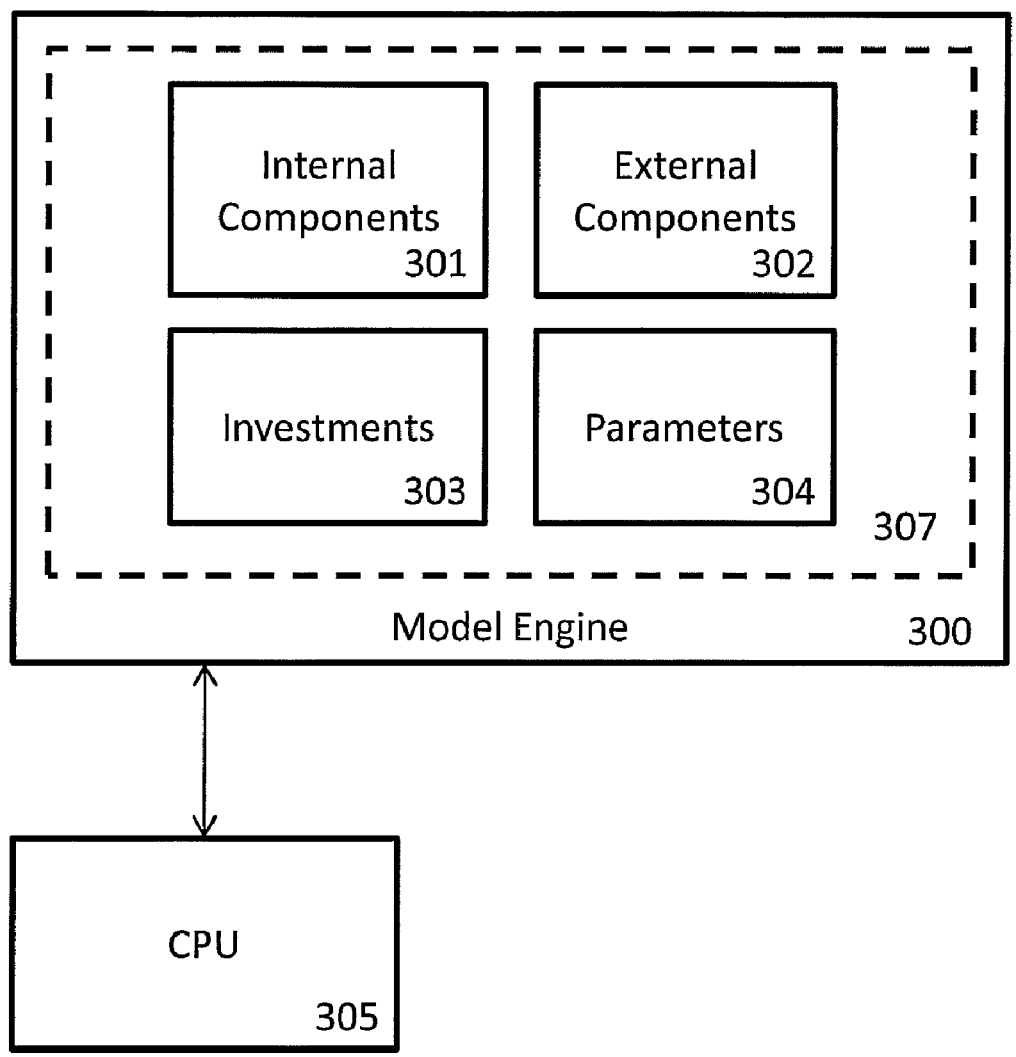
FIG. 3 is a schematic block diagram of a model engine according to an example.

FIG. 3 is a schematic block diagram of a model engine according to an example. Model engine 300 is used to define and build a model of a system for exploration of a potential security risk. A model engine 300 uses a set of internal 301 and external 302 components to form a model 307. Engine 300 further includes data representing a set of investment choices 303, and a set of related parameters 304 for the model 307. Parameters 304 affect stochastic randomized elements within the model 307. Typically, parameters 304 can vary over a range defining a desired or acceptable interval for a particular metric associated with a change. As an example, the implementation of biometric sensors in an environment in order to shore up access control will typically involve a financial investment. An associated set of parameters would be a number of sensors to be installed in the environment, as well as the location and complexity of the sensors for example. Variation of these parameters within a given interval will lead to a number of outcomes based on the investment in view of the external threat environment.

According to an example, the model engine 300 can be functionally linked to a processor 305 (CPU) for performing calculations for the engine. Other connections to the model engine 300 have been omitted in FIG. 3 for the sake of clarity. Internal 301 and external 302 components define elements of the model 307 which are used to define a system, security risk or issue. Investments 303 include data representing a set of changes which can be made in an environment such as an organization according to the model 307. The changes can relate to a change in any of a process, product, workflow and workforce for example. Such changes can cause an investment in time, money or other resources to be deployed. As such, the changes will typically involve some form of effort in order to be implemented—that effort can be purely financial in nature, or could involve a cost neutral change or could be a combination of a cost and some other effort for example. According to an example, a change can include the provisioning or de-provisioning of an access control or a change relating to an alteration in a user's identity (such as a change in the privilege of a user, e.g. from user to super-user and so on).

Typically, an investment 303 will be a financial investment, either direct or indirect—for example, implementing a new process, tool, product or workflow to mitigate the effects of an identified security risk, and/or releasing some proportion of a workforce to perform tasks aimed at mitigating the risk, and/or engaging additional workforce. Some investments may be less straightforward to quantify. For example, an investment in a behavioral change such as a change in a process or workflow which is performed by some proportion of a workforce, can be parameterized in various different ways. One possible way to parameterize such an investment could be by determining a temporal range as a result of possible delays to some portion of a workflow as a result of a change intended to make the workflow more robust, such as by a person interposing on certain actions to verify consistency and/or accuracy of a provisioning or de-provisioning process for example.

According to an example, engine 300 is therefore used to generate a model 307 for an aspect of a system which can include a security risk using multiple ones of the internal 301 and external 302 components, which components define adjustable elements of the model 307. The components and the relationships and functional links between the components define the model (relationships can be causal, communication of data, links to shared resources or queues, etc.). The aspect of the system can include a process, workflow, and product. The generated model is used to perform a set of calculations to explore a space of outcomes using different intervals for multiple parameters 304, such as under different investment choices or under specific conditions in the threat environment for example. According to an example, a risk analyzer is used to perform calculations in a consistent manner. It supports the process of defining discrete combinations of parameter variations (experimental cases) and can generate/manage structures to hold simulation data, perform repeated randomized runs within each experimental case, and gather basic statistics for each experimental case, including confidence intervals (standard error) for example.

Figure 4:
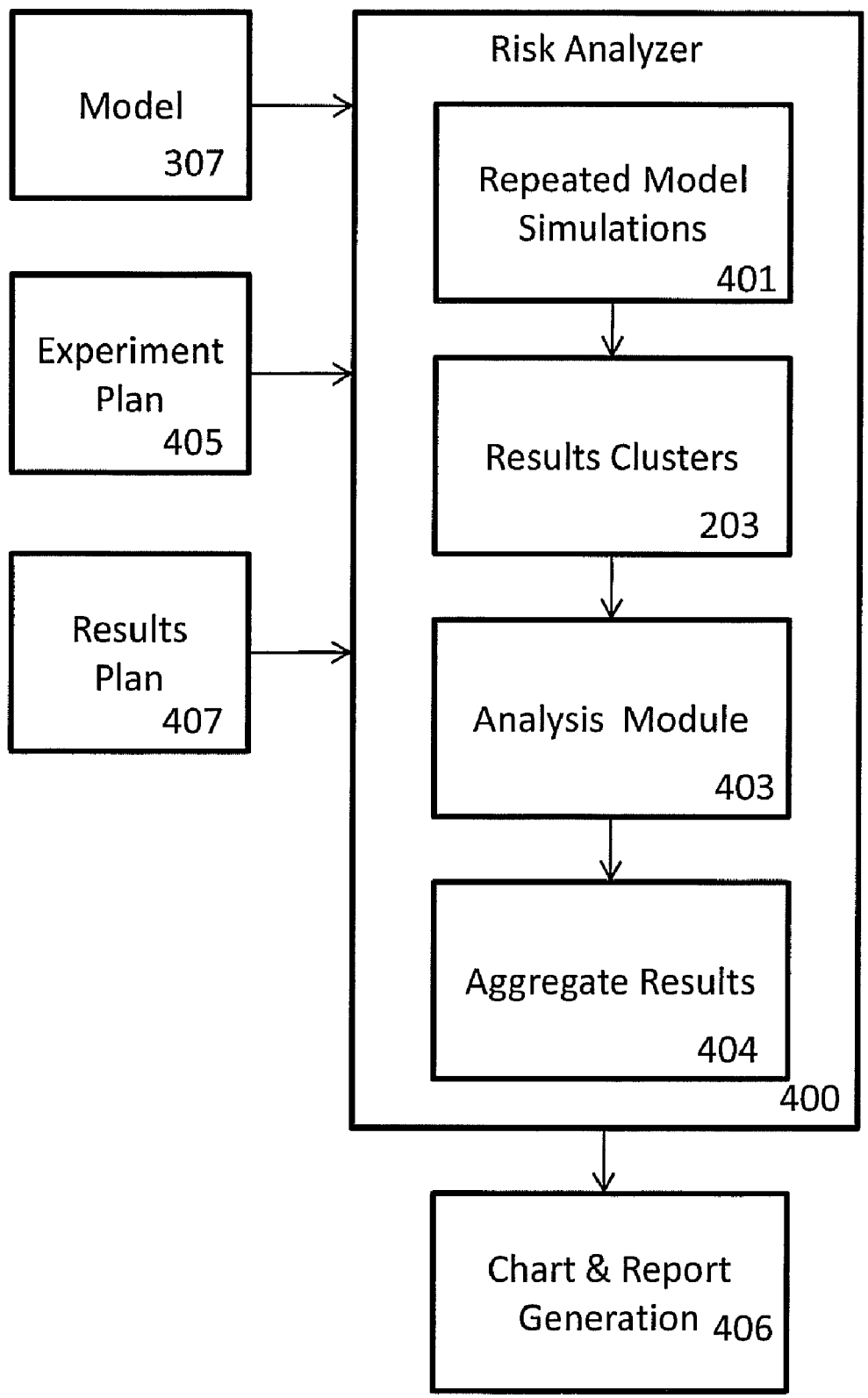
FIG. 4 is a schematic block diagram of a process for performing a set of calculations using a risk analyzer according to an example.

FIG. 4 is a schematic block diagram of the process for performing a set of calculations using a risk analyzer 400 according to an example. Output from risk analyzer 400 is typically determined by several pieces of information—the given model 307, an experiment plan 405, and a results plan 407. The model 307 identifies the system to be investigated in terms of its process behavior. This process behavior is subject to the (numerical and structural) parameters 404 that affect stochastic randomized elements within the model. Accordingly, the model can be indicative of a security risk in an environment 100 by virtue of the fact that it models a particular process susceptible to threats and access control issues. An experiment plan 405 sets out which of the parameters 404 are to be varied and what the variation will be (typically in terms of ranges or intervals, as described). Parameter values may also be discrete symbolic expressions. According to a results plan 407, a bulk dataset of multiple results clusters 203 is generated within the scope of the experiment plan 405. For example, an experiment plan 405 may specify that a certain parameter be varied within a given range—each discrete value of that parameter within the specified range can provide a results cluster. A results plan 407 identifies results to present from the generated results clusters 203. For example, as described, multiple results clusters 203 may include data representing the effect of variation of a parameter in a specified range. A results plan 407 can specify that data from multiple such clusters 402 be used to generate a visual representation of the way in which variation of the parameter affects the security risk.

Accordingly, a set of parameters 404 of a model 307 are varied in a set of repeated randomized model simulation runs 401 according to an experiment plan 405 which includes data representing which of parameters 404 to vary, a range for the variation, and an associated granularity for the variation (such that variations are performed in integer multiples of units of the parameter in question, or some other multiple for example). An experiment plan 405 and a results plan 407 can be provided in terms of a simple text format or in another marked up format such as XML for example. In order to cause randomization in the runs, each run within each case is provided with a random seed that is used to prime a Pseudo-Random Number Generator that provides for the randomized choices made during a simulation. These initial 'seed' values are provided in terms of an independently generated list of random integers (a seed file). For example, if a model of an environment E in which there exists a security risk S1 comprises multiple components $\{C\}=[C1, C2, \ldots Cn]$, with an associated set of parameters $\{P\}=[P1, P2, \ldots Pm]$ representing adjustable measures for the components (wherein each component in $\{C\}$ may have multiple parameters associated with it), an experiment plan 405 can define which of the $\{P\}$ are adjusted and a range for adjustment. So for example, if experiment plan 405 describes that a subset of $\{P\}$ be used, an initial seed can be used to generate random numbers which are used to determine values for these parameters (within their respective ranges). Each set of values for parameters forms a 'run', so that multiple runs are performed within the search scope of parameters, thereby providing results clusters 203 (i.e. multiple output configurations calculated using the risk analyzer 400). In this way, the search space for parameters can be explored. That is to say, repeated runs 401 are performed according to the experiment plan within the search intervals defined and using the list of random numbers. The output from a set of repeated runs forms a results cluster 402 representing the set of possible outcomes according to the randomized runs using the model in view of the experiment plan. An analysis module 403 can take the clusters 402 as input and can aggregate the results 404 according to the results plan 407. In this connection, aggregating results in block 404 of analyzer 400 allows data from multiple experiments (multiple results clusters 203) to be presented in a manner that is comprehensible to the stakeholders and that usefully shows outcomes in terms of risk exposure. Representation can be done in the form of charts and tables and to support this, a charting and report generation component 406 can be used is used. Component 406 can calculate statistical results/information gathered over runs. For example, histograms can be calculated to show frequency plots of how many values fall within particular ranges (bins). These can be useful descriptions of probability information and indicate where the most frequent range of values arises. Also, time series charts can be provided to show how selected quantities vary over time.

A different experiment plan can specify that a different subset of $\{P\}$ is used—for example, to explore the way in which different investment choices can affect a situation or risk. Accordingly, corresponding clusters of results can be obtained which may be different even though the same model is used. According to an example, a specific investment choice can be explored using outputs from risk analyzer 400 operating under different experiment plans 405.

Figure 5:
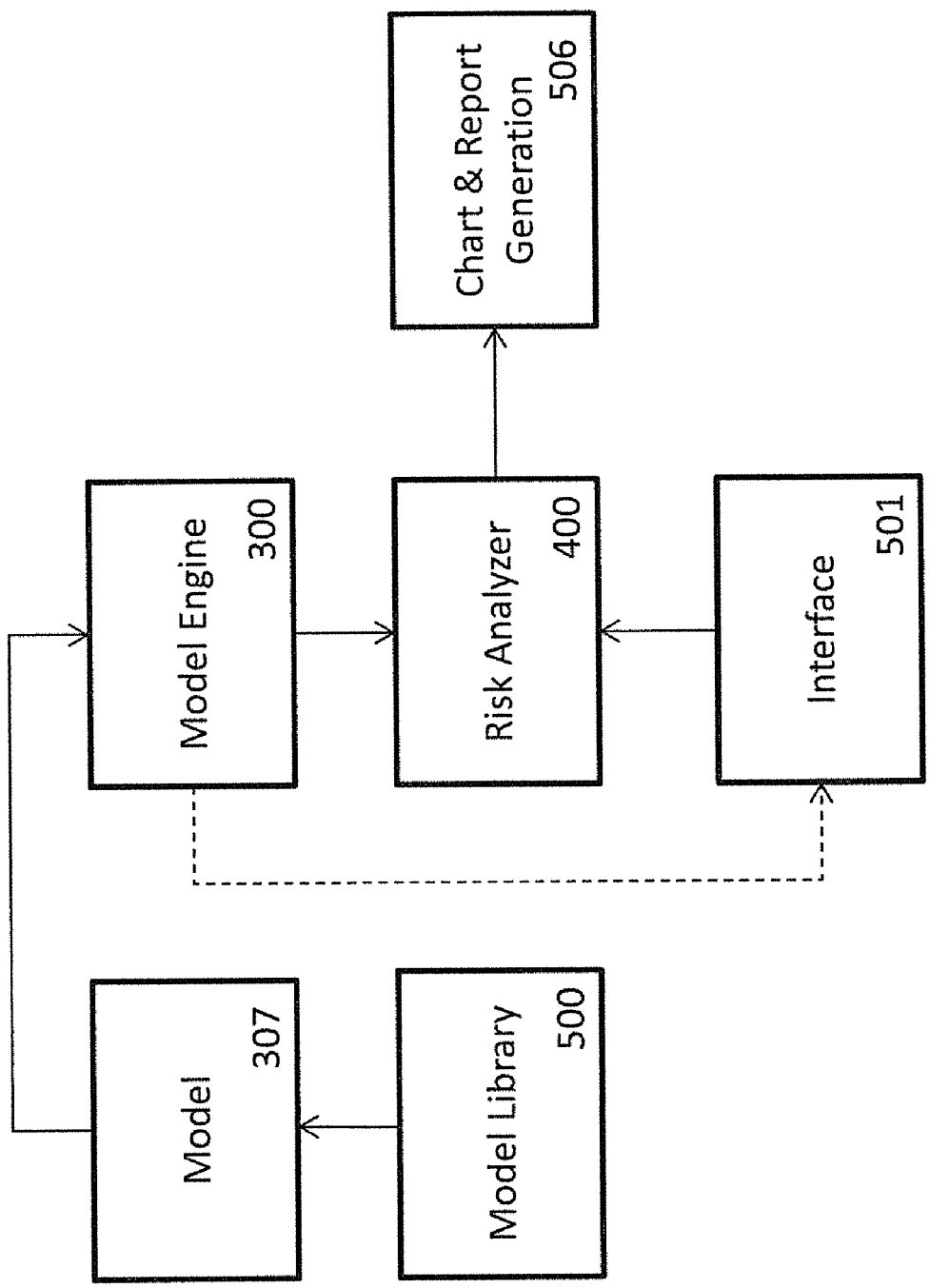
FIG. 5 is a schematic block diagram of a system for according to an example.

FIG. 5 is a schematic block diagram of a system according to an example. A model library 500 includes multiple generic models for a system for analyzing a security risk. For example, model library 500 can include common or nonspecific model templates, which can be augmented or amended based on the specific security risk or environment under consideration. A model 307 for a risk is selected from model library 500 and input to model engine 300. According to an example, the model engine 300 receives data representing a model and can translate (or compile) objects or components from the model to machine readable code. An intermediate action can be used according to an example, in which objects or components are compiled into intermediate instructions for the system that can then be compiled into fully machine readable instructions. According to an example, each model component can have a unique shape type associated with it which has a corresponding class which contains machine readable instructions for communicating with the model engine 300. According to an example, the shape type for a component can be provided as a graphical representation for the component which is distinct from other components thereby allowing a user of the system to distinguish between components, such as when altering or creating a model for example. A link between graphical representations provides a logical flow for a model. The model 307 as compiled by the model engine 300 is used by the risk analyzer 400 in order to generate a set of output configurations as described above.

In block 506, chart and report generation uses the results from risk analyzer 400. An interface 501 can be used according to an example to allow users to explore and conduct investigations quickly by using the output from a modeled situation, or by allowing a user some degree of control over the way in which a situation is investigated. More specifically, interface 501 can use parameters 304 from the model engine 300 to provide multiple user adjustable options which can be used to modify parameters and/or ranges in response to output configurations. The adjustments made can cause the risk analyzer to calculate multiple new output configurations on the basis of the adjustments made without the need for a model to be regenerated in model engine 300. Accordingly, interface 501 provides an easy to understand and efficient way of allowing multiple parties to see in real time the effects that changes may have to a risk or environment. For example, for a given security risk relating to the provision of access control, an interface can allow a user to modify parameters or ranges relating to the number of points in an infrastructure adapted to increase access control. An interface 501 can also be provided which gives a user control over a model or template.

Figure 6:
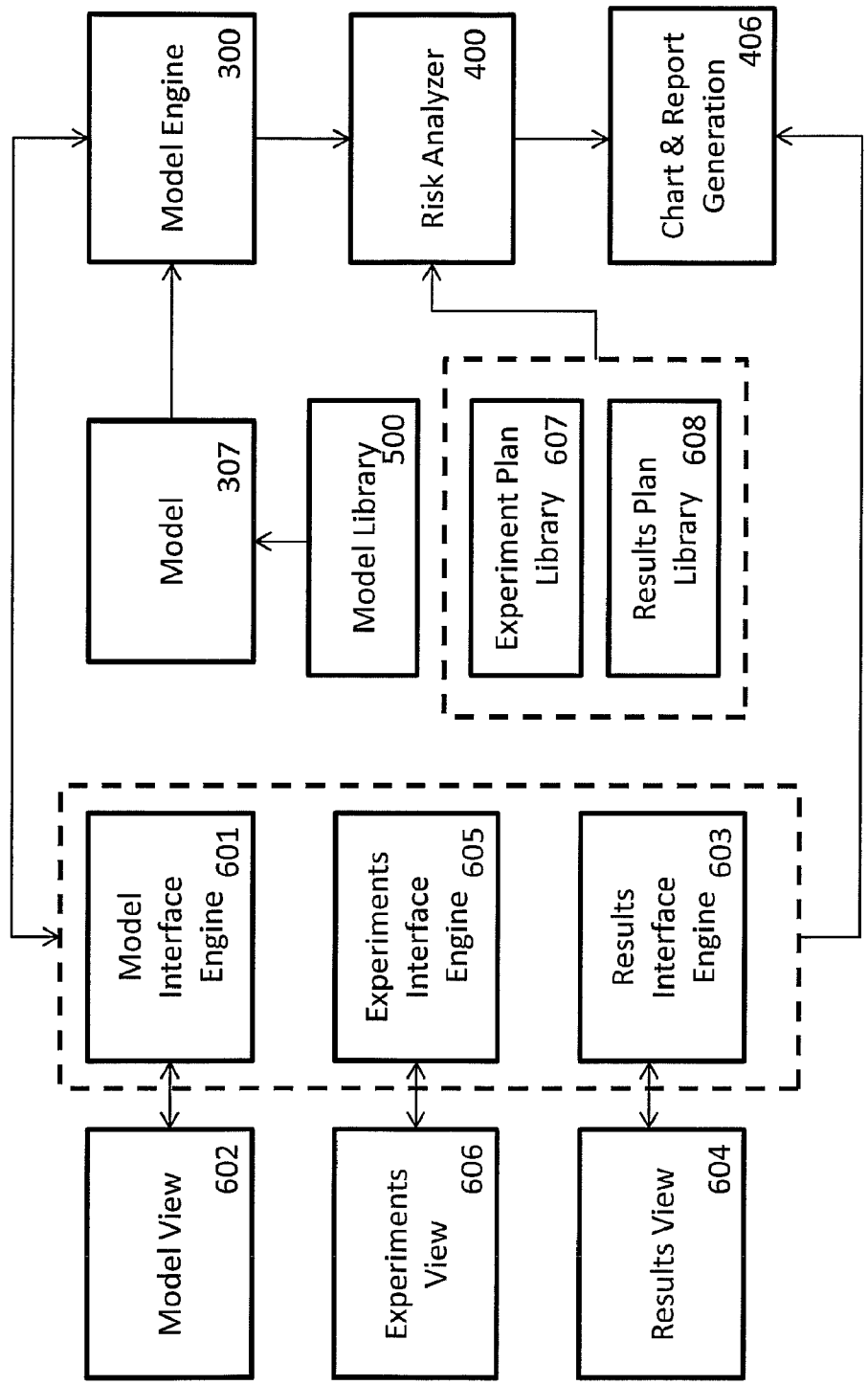
FIG. 6 is a schematic block diagram of a system for according to an example.

Accordingly, FIG. 6 is a schematic block diagram of a system according to an example. As before, a model library 500 includes a set of template models for modeling multiple different situations. The templates can be used as provided, or used as the basis for a model—that is, the templates can be amended by a user in order to more accurately represent the situation or risk being modeled. The system of FIG. 6 further includes an experiment plan library 607 and a results plan library 608. An experiment plan library 607 includes multiple files of machine readable instructions for experiments to be performed on a model from the model library 500. More specifically, the library 607 includes a set of templates for defining the way in which a model of a situation or risk can be used to generate results. For example, an experiment plan from library 607 can provide instructions representing parameters of a model to be varied in calculations and a range of variation of the parameters. Accordingly, since certain parameters from models of the model library 500 can be specific to certain situations or risks, experiment plans can be geared for generating a set of results for the specific situation in question by providing templates which affect those parameters which are relevant, such as those which may have an influence or bearing on a end result. According to an example, a model from model library 500 can have multiple relevant experiment plans associated with it, with each model/experiment plan combination providing a way of modeling a certain situation or risk.

Similarly, a results plan library 608 includes a set of multiple files of machine readable instructions defining multiple different ways in which results which have been calculated can be processed and displayed. For example, for a given model and experiment plan, results clusters 203 can be generated. A results plan can use the clusters to extract certain data of interest, which can then be used in chart and report generation 306. For a given model/experiment plan combination, multiple results plans can be used to extract different data from multiple corresponding results clusters 203.

According to an example, a package can be provided including a model template with an associated experiment and results plan which is defined to be applicable to a particular type of system. For example, in the field of access control, a generic and adjustable model template can be provided to model a system, and an experiments plan can be included which is predefined for generating multiple configurations for the system in response to changes in access controls. Similarly, a packaged results plan can provide access to results geared for a determination and analysis of data relating to access control.

The system of FIG. 6 further includes a model interface engine 601 and associated model view interface 602, a results interface engine 603 and associated results view interface 604, an experiments interface engine 605 and associated experiments view interface 606. Interfaces 602, 604, 606 provide mechanisms for users to interact with the system. The interfaces 602, 604, 606 provide mechanisms for users to interact with the system of FIG. 6 in different operating modes of the system. According to an example, certain ones of the modes can be restricted and unavailable to certain users.

Results interface engine 603 drives a results view interface 604. The results view interface 604 allows a user to make queries of the system using results which have already been generated in risk analyzer 400. For example, a given model from model library 500 in combination with an experiment plan from experiment plan library 607 and results plan from results plan library 608 are used in order to calculate clusters of results for a specific security risk. The results plan used specifies that certain data is extracted and used in chart and report generation 406 in order to provide a user with some predefined (according to the results plan) results, such as a set of graphs for example. The results view interface 604 allows a user with the appropriate permissions to initiate chart and report generation using calculated data in order to provide results outside of the scope of the results plan. According to an example, the results used for such chart and report generation are pre-existing—that is, the use of the results view interface does not cause new data to be calculated, it allows a user to query data already present and which may not have been displayed to the user (such as data not displayed to a user because it is outside of the results pan scope for example). A results interface engine 603 is therefore able to use data in existing results clusters 203.

Experiments interface engine 605 drives an experiments view interface 606 to provide a mode of operation of the system of FIG. 6 which allows a user with appropriate permissions to make queries which involve calculation of new results within the scope of the model being used. That is to say, the model 307 can be altered to an extent in order to allow results clusters 203 to be augmented with additional data which the user desires. Accordingly, via the experiments view interface 606, the experiments interface engine 605 can vary parameters 304 used and/or ranges of parameters used and investments 303 for example. Accordingly, experiments interface engine 605 is operatively coupled to the model engine 300 for the purposes of varying investments 303, associated parameters 304 and/or ranges for parameters. Such changes cause risk analyzer 400 to calculate further result clusters 302 using the extended search space. Such a mode of operation can be a mode which is considered to be more privileged than that associated with the results view interface mode of operation Model interface engine 601 drives a model view interface 602 to provide a mode of operation of the system of FIG. 5 which allows a user with appropriate permissions to make queries which involve a change in the model 307. For example, the interface 602 can be used to alter internal 301 and/or external 302 components for a model 307. Investments 303, parameters 304 and associated ranges can also be changed in this mode. Accordingly, model view interface engine 601 is operatively coupled to the model engine 300 for the purposes of varying internal components 301, external components 302, investments 303, parameters 304 and/or ranges for parameters for a model. Such a mode of operation can be a mode which is considered to be more privileged than that associated with the experiments view interface mode of operation.

Figure 7:
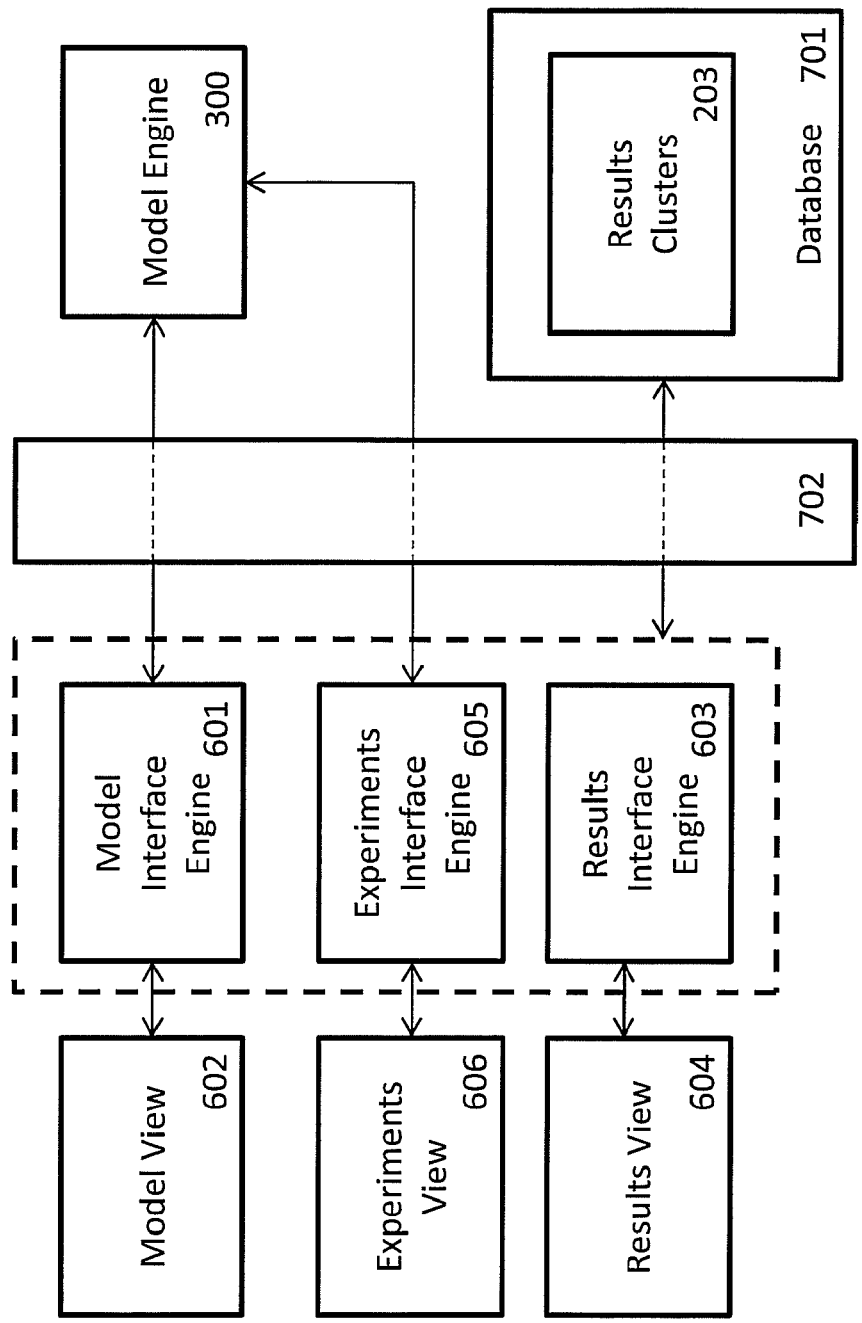
FIG. 7 is a schematic block diagram of a system according to an example.

FIG. 7 is a schematic block diagram of a system according to an example. As described with reference to FIG. 6, modes of operation using a model view interface 602 and experiments view interface 606 include the provision of using the model engine 300 to change a model or aspects of a model. Both interfaces also have access via their respective engines 601, 605 to the results clusters 203 so that existing data can be queried. Results view interface 604 has access to results clusters 203 (via results interface engine 603). According to an example, results clusters 203 can be stored in a database 701 which is accessible by engines 601, 605, 603 via a network 602. For example, the interfaces 602, 604, 606 can be web-based interfaces running in a browser such as Internet Explorer or Firefox or similar on a computing apparatus. Database 701 can be a database which is stored at a location which is remote from the apparatus and which communicates over a network 702 with the database 701. Network 702 can be a network which is internal to a company, such as a company intranet for example, or can be a public network such as the Internet for example. Similarly, model engine 300 can be remotely queried over network 702. Alternatively, the database 701 and model engine 300 can be locally stored on a computing apparatus such as a desktop or laptop computer or other suitable device such as a mobile station.

According to an example, database 701 can store data representing packages as described above. In addition to unified packages/projects, database 701 can include information about people who have rights to access a package or project and a description of the package or project. The information can be stored as metadata for example.

Figure 8:
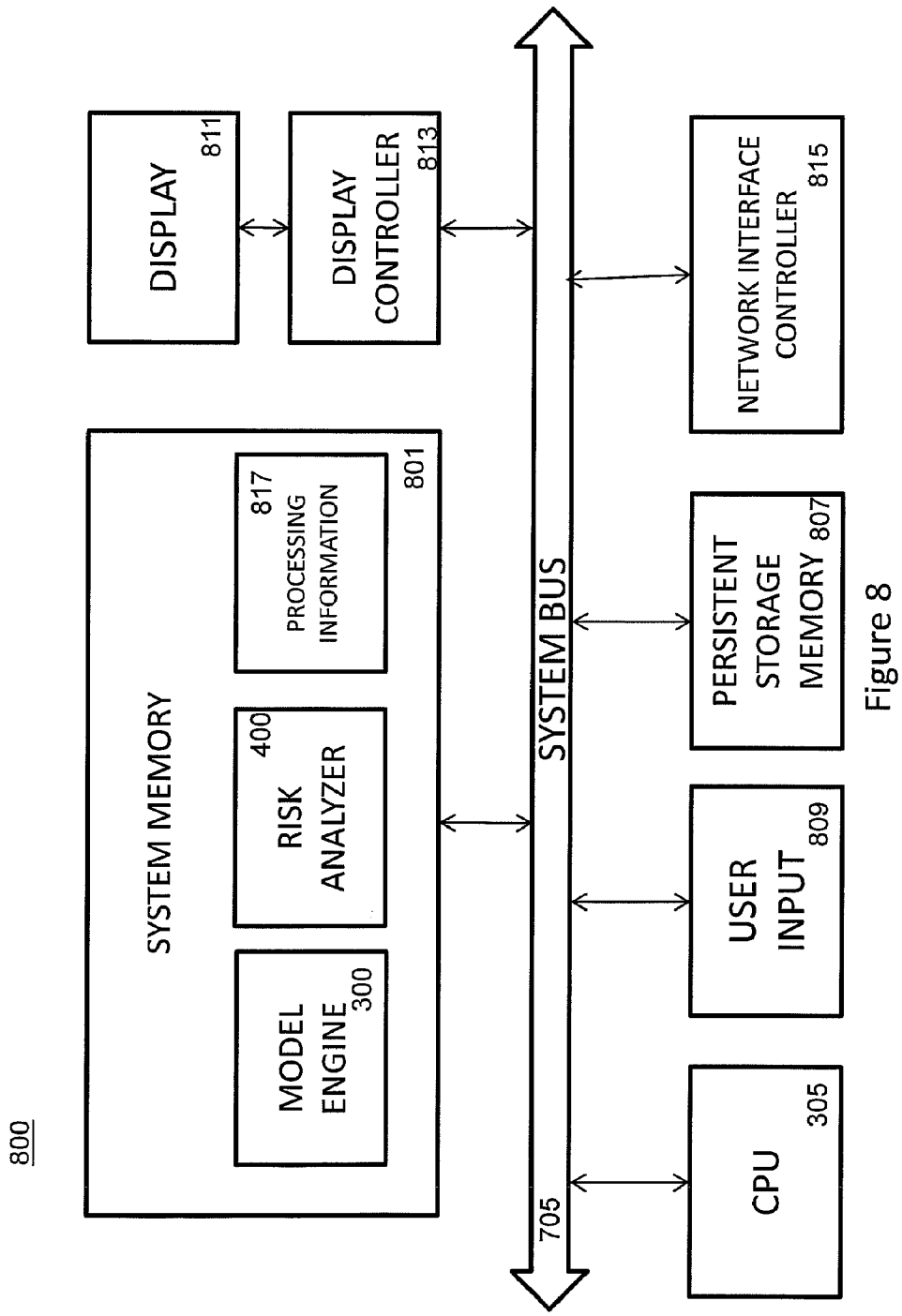
FIG. 8 is a schematic block diagram of a system according to an example.

FIG. 8 is a schematic block diagram of a system according to an example. The system 800 includes a processing unit 305, a system memory 801, and a system bus 805 that couples processing unit 305 to the various components of the system 800. The processing unit 305 typically includes a processor, such as a multi-core processor for example, which may be in the form of any one of various commercially available processors. The system memory 801 typically includes a read only memory (ROM) that stores a basic input/output system (BIOS) that contains start-up routines for the system 800 and a random access memory (RAM). The system bus 805 may be a memory bus, a peripheral bus or a local bus, and may be compatible with any of a variety of bus protocols, including PCI(e), VESA, Microchannel, ISA, and EISA. The system 800 also includes a persistent storage memory 807 (e.g., a hard drive (HDD), a CD-ROM drive, magnetic tape drives, flash memory devices, and digital video disks) that is connected to the system bus 805 and contains a computer-readable media disk to provide non-volatile or persistent storage for data, data structures and computer-executable instructions.

A user may interact (e.g., enter commands or data) with system 800 using input devices 809 (e.g., a keyboard, a computer mouse, a microphone, joystick, and touch pad or touch sensitive display screen). Information may be presented through a user interface that is displayed to a user on the display 811 (implemented by, e.g., a display monitor which can be touch sensitive, including a capacitive, resistive or inductive touch sensitive surface for example), and which is controlled by a display controller 813 (implemented by, e.g., a video graphics card). Accordingly, any one of the interfaces 602, 604, 606 can be presented to a user using display 811. A user can then interact with the interface using input devices 809 in order to cause CPU 305 and memory 801 to effect aspects of the system 800.

The system 800 also typically includes peripheral output devices, such as speakers and a printer. A remote computer may be connected to the system 800 through a network interface card (NIC) 815. Alternatively, system 800 can upload retrieved data, or a pointer thereto, to a remote storage service such as cloud based service for example. For example, a database 601 can be stored on a cloud based storage service, and results clusters 203 stored in database 701 can be queried over the network 702 using controller 815.

As shown in FIG. 8, the system memory 801 also stores model engine 300 and risk analyzer 400 as well as processing information 817 that can include results clusters 203, an experiment plan 405 and a results plan 407. A model library 500, experiment plan library 607 and results plan library 608 can be stored in persistent storage 807, or accessed at a remote storage location (not shown) using network controller 815.

Accordingly, in the system 800, model engine 300 receives a model 307 representing an environment 100 in which provisioning and de-provisioning processes for access control of individuals in the environment operate to control access rights and credentials for the individuals so that access to systems of the environment can be managed in order to mitigate the effects of security risks associated with incorrect rights, credentials or privileges (which can include the absence or rights or credentials as well as the incorrect presence of the same). A risk analyzer 400 of system 800 calculates multiple output configurations for the environment 100 as a result of processes in place and in view of changes to access controls, and results are presented using display 811. Display 811 further enables a user of the system 800 to use multiple interfaces to adapt the system 800 for the purpose of modifying the results which are calculated and displayed. For example, a user can use an input device 809 to change aspects of a model 307 input to model engine 300 which results in risk analyzer 400 calculating a set of alternate results.

Figure 9:
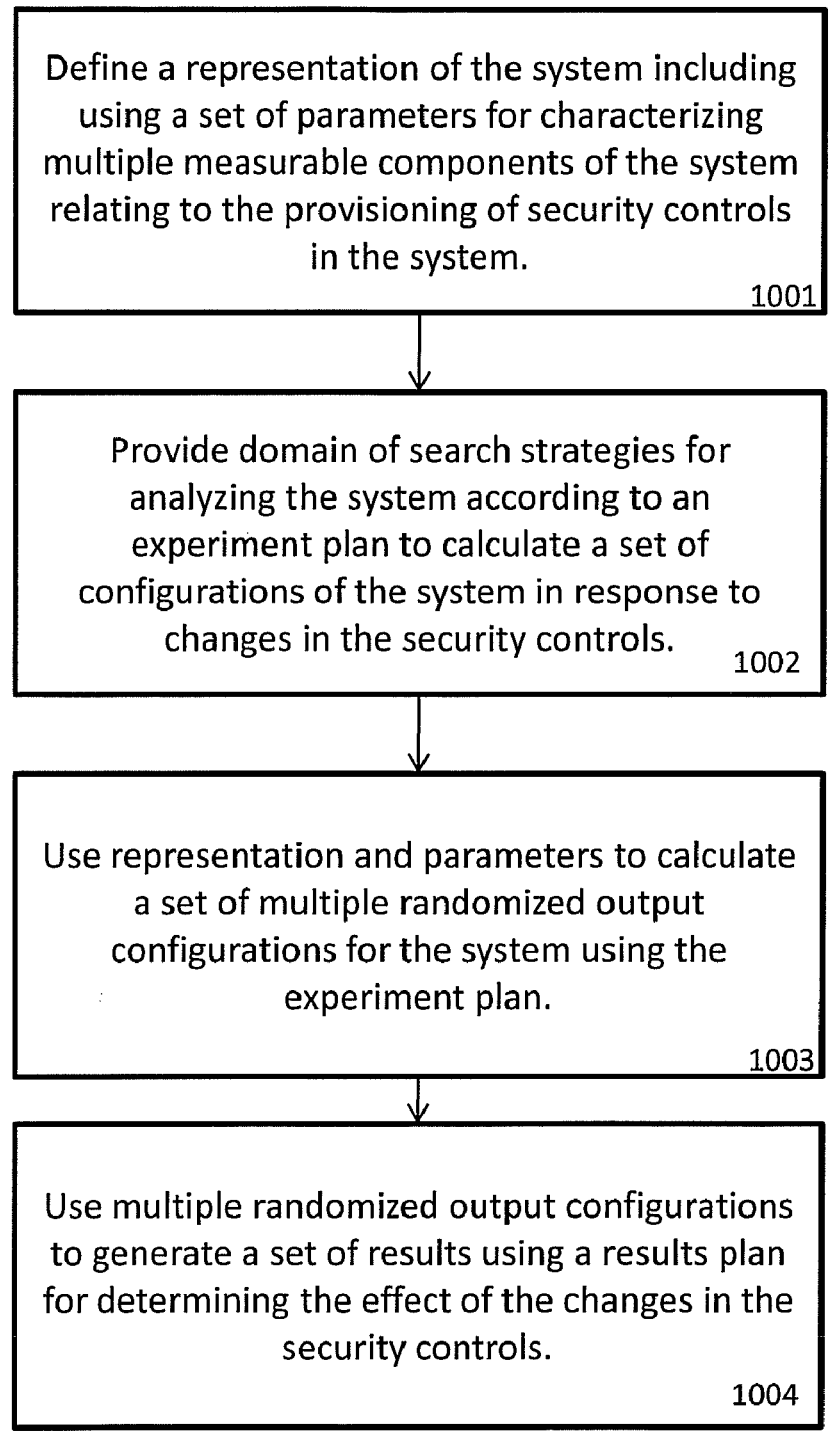
FIG. 9 is a block diagram of a method according to an example.

FIG. 9 is a schematic block diagram of a method according to an example. In block 1001 a representation of the system is defined including using a set of parameters for characterizing multiple measurable components of the system relating to the provisioning of security controls in the environment. In block 1002 a domain of search strategies is provided for analyzing the system according to an experiment plan to calculate a set of configurations of the environment in response to changes in the security controls. In block 1003 the representation and the parameters are used to calculate a set of multiple randomized output configurations of the system using the experiment plan. In block 1004 the multiple randomized output configurations are used to generate a set of results using a results plan for determining the effect of the changes in the security controls.

What is claimed is:

1. A system for analyzing a process, comprising:
a memory storing machine readable instructions for a model engine and a risk analyzer,
wherein the model engine is to generate a model of an environment using multiple components defining adjustable elements of the model and including components representing a process for provisioning and de-provisioning of access credentials for an individual in the environment; and
wherein the risk analyzer is to calculate multiple randomized instances of an outcome for the environment using multiple randomized values for parameters of the elements of the model selected from within respective predefined ranges for the parameters, and to use a results plan to provide data for identifying a security risk of the process using the multiple instances; and
a processor to implement the machine readable instructions.

2. A system as claimed in claim 1, further comprising:
multiple interface engines to control respective interfaces of the system for allowing a user to control the system according to a mode of operation of an interface.

3. A system as claimed in claim 2, further comprising:
a network interface controller to control access from the multiple interface engines to a database for the system storing data representing a set of results clusters representing the multiple instances, wherein access to the database is controlled according to the mode of operation of a selected interface.

4. A system as claimed in claim 1, wherein the risk analyzer is further to:
calculate multiple instances of an outcome for the environment using an experiment plan from an experiment plan library.

5. A system as claimed in claim 2, wherein the model engine is further to:
provide access to multiple internal and external components and parameters for the model via the multiple interface engines, the internal components including representations of specific tasks undertaken in security operations, a speed with which these tasks are undertaken and specific security solutions and mechanisms and their properties, the external components including representations corresponding to an external threat environment.

6. A system as claimed in claim 5, wherein the multiple internal and external components are provided as graphical representations for the system and wherein the model engine is further to use the graphical representations to compile respective machine readable instructions for the components.

7. A method for analyzing a system comprising:
defining, by a processor, a representation of the system including using a set of parameters for characterizing multiple measurable components of the system relating to the provisioning of security controls in the system;
providing a domain of search strategies for analyzing the system according to an experiment plan to calculate a set of configurations of the system in response to changes in the security controls;
using, by the processor, the representation and multiple randomized values of the parameters to calculate a set of multiple randomized output configurations for the system using the experiment plan; and
using, by the processor, the multiple randomized output configurations to generate a set of results using a results plan for determining the effect of the changes in the security controls.

8. A method as claimed in claim 7, wherein defining a representation includes using a template from a model library to characterize the system in response to a determination of multiple investment choices associated with a security risk of the system.

9. A method as claimed in claim 7, wherein calculating a set of multiple randomized output configurations includes using a random number generator to set the multiple randomized values of the parameters.

10. A method as claimed in claim 7, further comprising adjusting a measurable component of the representation in response to an output configuration.

11. A method as claimed in claim 7, further comprising providing multiple interfaces for interacting with the representation and the set of results to redefine a search strategy or a component of the representation.

12. A method as claimed in claim 7, wherein provisioning of security controls includes providing, maintaining and revoking access privileges within the system.

13. A method as claimed in claim 7, wherein the multiple measurable components of the system include a component to define an approval action for the security control and a component to define a deployment action for the security control in the system.

14. A method as claimed in claim 7, further comprising:
providing multiple interface views with different access privileges to control access to respective interface engines for changing the representation, experiment plan and results plan.

15. A method as claimed in claim 14, further comprising:
providing multiple projects in a database, each project including data representing a model template, experiment plan and results plan and metadata associated with the project including a description for the contents of the project and access control data defining access rights for a user accessing the database using an interface view.

16. A system for analyzing an identity and access management process, comprising:
a memory storing machine readable instructions for a model engine and a risk analyzer,
wherein the model engine is to receive data representing a model for an environment, wherein an identity and access management process operates to control identity and access rights for individuals in the environment; and
wherein the risk analyzer to calculate multiple output configurations of the model using multiple randomized values for parameters of the elements of the model; and
a display to control access to multiple interfaces to adapt the system for the purpose of modifying the output configurations.

17. A system for analyzing a process as claimed in claim 16, wherein:

the identity and access management process is a provisioning and de-provisioning process to control access rights and credentials for the individuals for access to systems of the environment.

18. A system as claimed in claim 17, wherein the multiple output configurations are randomized output configurations in a search domain defined by the multiple randomized parameters of the model.

19. A non-transitory machine-readable medium storing machine-readable instructions that when executed cause a processor to:

receive data for a model representing an identity and access management process including a parameter for mitigating a security risk of the process;

receive data representing an interval in which the parameter can be varied;

receive data representing a randomized value for the parameter from within its associated interval;

execute the model using the randomized value to calculate data for an output configuration for the security risk;

receive data representing selection criteria for selecting a subset of the data for the output configuration; and display data for the subset to enable mitigation of the security risk.

* * * * *